United States Patent
Park et al.

(10) Patent No.: US 12,512,264 B2
(45) Date of Patent: Dec. 30, 2025

(54) DIELECTRIC COMPOSITION AND MULTILAYER CAPACITOR

(71) Applicant: SAMSUNG ELECTRO-MECHANICS CO., LTD., Suwon-si (KR)

(72) Inventors: Jae Sung Park, Suwon-si (KR); Hyoung Uk Kim, Suwon-si (KR); Je Hee Lee, Suwon-si (KR); Hyung Joon Jeon, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 222 days.

(21) Appl. No.: 18/080,349

(22) Filed: Dec. 13, 2022

(65) Prior Publication Data
US 2023/0215635 A1    Jul. 6, 2023

(30) Foreign Application Priority Data

Dec. 30, 2021 (KR) .................. 10-2021-0192725
Dec. 7, 2022 (KR) .................. 10-2022-0169695

(51) Int. Cl.
*H01G 4/30* (2006.01)
*C04B 35/468* (2006.01)
*H01G 4/12* (2006.01)

(52) U.S. Cl.
CPC ....... *H01G 4/1227* (2013.01); *C04B 35/4682* (2013.01); *H01G 4/30* (2013.01);
(Continued)

(58) Field of Classification Search
CPC ........ C04B 35/4682; C04B 2235/3206; C04B 2235/3208; C04B 2235/3224;
(Continued)

(56) References Cited

U.S. PATENT DOCUMENTS 5,225,960 A    7/1993  Kishi et al.
5,734,545 A    3/1998  Sano et al.
(Continued)

FOREIGN PATENT DOCUMENTS

JP    3334607 B2    8/2002
JP    2007-234677 A    9/2007
(Continued)

OTHER PUBLICATIONS

H. Kishi, et al., "Base-Metal Electrode-Multilayer Ceramic Capacitors: Past, Present and Future Perspectives," The Japanese Journal of Applied Physics, No. 42, Feb. 16, 2022.

*Primary Examiner* — Arun Ramaswamy
(74) *Attorney, Agent, or Firm* — Morgan Lewis & Bockius LLP

(57) ABSTRACT

A dielectric composition and a multilayer capacitor including the same are disclosed. The dielectric composition including: a $BaTiO_3$-based main ingredient; a first auxiliary ingredient including rare earth elements; and a second auxiliary ingredient including at least one of Ba and Ca but essentially including Ba, wherein the rare earth elements include Tb and Dy, and the first auxiliary ingredient and the second auxiliary ingredient satisfy a molar content condition of $0.40<(Tb/T\_RE)*(Ba+Ca)<0.93$, where $T\_RE$ is a total molar content of the rare earth elements in the first auxiliary ingredient.

15 Claims, 5 Drawing Sheets

(52) U.S. Cl.
CPC .............. *C04B 2235/3224* (2013.01); *C04B 2235/3236* (2013.01); *C04B 2235/442* (2013.01)

(58) Field of Classification Search
CPC ........ C04B 2235/442; C04B 2235/785; C04B 2235/3236; H01G 4/1227; H01G 4/248; H01G 4/30
USPC ............. 361/301.4, 321.1, 321.5, 311, 321.4
See application file for complete search history.

(56) References Cited

U.S. PATENT DOCUMENTS

| | | | |
|---|---|---|---|
| 5,742,473 | A | 4/1998 | Sano et al. |
| 5,815,368 | A | 9/1998 | Sakamoto et al. |
| 5,818,686 | A | 10/1998 | Mizuno et al. |
| 5,862,034 | A | 1/1999 | Sato et al. |
| 5,995,360 | A | 11/1999 | Hata et al. |
| 6,243,254 | B1 | 6/2001 | Wada et al. |
| 6,245,433 | B1 | 6/2001 | Nakamura et al. |
| 6,346,497 | B1 | 2/2002 | Nakamura et al. |
| 6,380,116 | B1 | 4/2002 | Okamatsu et al. |
| 6,485,672 | B1 | 11/2002 | Nomura et al. |
| 6,548,437 | B2 | 4/2003 | Sato et al. |
| 2008/0112109 | A1* | 5/2008 | Muto .................... H01G 4/1245 361/301.4 |
| 2013/0083449 | A1* | 4/2013 | Yoon ....................... H01G 4/30 501/137 |
| 2015/0287535 | A1* | 10/2015 | Nakanishi ............ H01G 4/1227 361/301.4 |
| 2015/0299048 | A1* | 10/2015 | Yoon .................... H01G 4/1227 501/138 |
| 2016/0086735 | A1 | 3/2016 | Yoon et al. |
| 2018/0182557 | A1* | 6/2018 | Park .................. H01L 21/02186 |
| 2019/0228911 | A1* | 7/2019 | Inomata ................. H01G 4/008 |
| 2019/0304686 | A1* | 10/2019 | Kang .................... H01G 4/008 |

FOREIGN PATENT DOCUMENTS

| | | | | |
|---|---|---|---|---|
| JP | 2009-203089 A | | 9/2009 | |
| KR | 10-223471 A | | 8/1998 | |
| KR | 10-2016-0034763 A | | 3/2016 | |
| WO | WO-2009119444 A1 | * | 10/2009 | ......... C04B 35/4682 |

* cited by examiner

DIELECTRIC COMPOSITION AND MULTILAYER CAPACITOR

CROSS-REFERENCE TO RELATED APPLICATION(S)

This application claims benefit of priority to Korean Patent Application Nos. 10-2021-0192725 and 10-2022-0169695 filed on Dec. 30, 2021 and Dec. 7, 2022, respectively, in the Korean Intellectual Property Office, the disclosures of which are incorporated herein by reference in their entirety.

TECHNICAL FIELD

The present disclosure relates to a dielectric composition and a multilayer capacitor.

BACKGROUND

Capacitors are elements capable of storing electricity therein. When a voltage is applied to a capacitor in which two electrodes are basically disposed to face each other, the electricity is accumulated in each of the electrodes. In a case where the voltage applied to the capacitor is a direct current (DC) voltage, current flows in the capacitor while electricity is accumulated, but the current does not flow in the capacitor once the accumulation of the electricity is completed. On the other hand, in a case where the voltage applied to the capacitor is an alternating current (AC) voltage, an AC current flows in the capacitor while polarities of the electrodes alternate with each other.

Based on the type of insulator provided between electrodes, the capacitors may be classified into various types: an aluminum electrolytic capacitor including electrodes formed of aluminum and a thin oxide film between the aluminum electrodes; a tantalum capacitor using tantalum as an electrode material; a ceramic capacitor using a dielectric having high permittivity, such as titanium barium, between electrodes; a multilayer ceramic capacitor (MLCC) using high-permittivity ceramic in a multilayer structure as a dielectric provided between electrodes; a film capacitor using a polystyrene film as a dielectric between electrodes; and the like.

Among them, the multilayer ceramic capacitor has recently been used in various fields such as high-frequency circuits because it has excellent temperature and frequency characteristics and it can be implemented to have a small size. Recently, it has been continuously attempted to further decrease a size of the multilayer ceramic capacitor. To this end, dielectric layers and internal electrodes have been formed to have small thicknesses.

In order to achieve a decrease in size and an increase in capacitance of the multilayer ceramic capacitor, it is required to increase the number of dielectric layers and internal electrodes stacked by decreasing the thicknesses of the dielectric layers and the internal electrodes. Currently, the thickness of the dielectric layer has decreased to about 0.6 μm, and research on the decrease in thickness of the dielectric layer is continuously conducted. However, the decrease in thickness of the dielectric layer may cause deteriorations in DC-bias characteristics as well as reliability and high-temperature withstand voltage characteristics. The DC-bias characteristics refer to a phenomenon in which capacitance or permittivity decreases as a size of a DC-bias field applied to an MLCC increases. In various cases where MLCCs are applied, for example, application of MLCCs to power management integrated circuits, it is often that the MLCCs are used in a state where a DC-bias is applied thereto. Accordingly, there has been an increasing demand for an MLCC capable of realizing high effective permittivity or capacitance under a condition in which a high field DC-bias is applied thereto and a dielectric composition for manufacturing the same.

SUMMARY

An aspect of the present disclosure may provide a dielectric composition having high reliability and a multilayer capacitor using the same.

According to an aspect of the present disclosure, a dielectric composition includes a $BaTiO_3$-based main ingredient; a first auxiliary ingredient including rare earth elements; and a second auxiliary ingredient including at least one of Ba and Ca, wherein the rare earth elements include Tb and Dy, and the first auxiliary ingredient and the second auxiliary ingredient satisfy a molar content condition of $0.40<(Tb/T\_RE)*(Ba+Ca)<0.93$, where $T\_RE$ is a total molar content of the rare earth elements in the first auxiliary ingredient.

Tb and Dy molar contents may satisfy a condition of $0.35 \leq Tb/Dy \leq 1.20$.

A molar content of the first auxiliary ingredient may satisfy a condition of $0.26 \leq Tb/T\_RE \leq 0.55$.

Ba and Ca molar contents may satisfy a condition of $0 \leq Ca/(Ba+Ca) \leq 0.30$.

The rare earth elements may not include a rare earth element other than Tb and Dy.

The second auxiliary ingredient may include Ba.

Tb and Dy molar contents may satisfy a condition of $0.86 \leq Tb/Dy \leq 1.20$.

A molar content of the first auxiliary ingredient may satisfy a condition of $0.46 \leq Tb/T\_RE \leq 0.55$.

According to another aspect of the present disclosure, a multilayer capacitor may include: a body including a dielectric layer and a plurality of internal electrodes stacked with the dielectric layer interposed therebetween; and external electrodes disposed on the body and connected to the plurality of internal electrodes, wherein the dielectric layer includes a dielectric grain having a core-shell structure including a core portion and a shell portion, the shell portion having a different composition from the core portion, the shell portion includes a $BaTiO_3$-based main ingredient, a first auxiliary ingredient including rare earth elements, and a second auxiliary ingredient including at least one of Ba and Ca, the rare earth elements include Tb and Dy, and the first auxiliary ingredient and the second auxiliary ingredient satisfy a molar content condition of $0.40<(Tb/T\_RE)*(Ba+Ca)<0.93$, where $T\_RE$ is a total molar content of the rare earth elements in the first auxiliary ingredient.

D1 may satisfy a condition of $5\ nm \leq D1 \leq 100\ nm$, where D1 is a diameter of the core portion.

D2 may satisfy a condition of $50\ nm \leq D2 \leq 600\ nm$, where D2 is a diameter of the dielectric grain.

According to another aspect of the present disclosure, a dielectric composition may include: a $BaTiO_3$-based main ingredient; a first auxiliary ingredient including rare earth elements; and a second auxiliary ingredient including at least one of Ba and Ca, wherein the rare earth elements include Gd and Dy, and the first auxiliary ingredient and the second auxiliary ingredient satisfy a molar content condition of $0.34<(Gd/T\_RE)*(Ba+Ca)<0.68$, where $T\_RE$ is a total molar content of the rare earth elements in the first auxiliary ingredient.

Gd and Dy molar contents may satisfy a condition of $0.42 \leq Gd/Dy \leq 0.60$.

A molar content of the first auxiliary ingredient may satisfy a condition of $0.30 \leq Gd/T\_RE \leq 0.38$.

Ba and Ca molar contents may satisfy a condition of $0 \leq Ca/(Ba+Ca) \leq 0.30$.

The rare earth elements may not include a rare earth element other than Gd and Dy.

The second auxiliary ingredient may include Ba.

The second auxiliary ingredient may include $BaCO_3$.

The second auxiliary ingredient may be free of Ca.

According to another aspect of the present disclosure, a multilayer capacitor may include: a body including a dielectric layer and a plurality of internal electrodes stacked with the dielectric layer interposed therebetween; and external electrodes disposed on the body and connected to the plurality of internal electrodes, wherein the dielectric layer includes a dielectric grain having a core-shell structure including a core portion and a shell portion, the shell portion having a different composition from the core portion, the shell portion includes a $BaTiO_3$-based main ingredient, a first auxiliary ingredient including rare earth elements, and a second auxiliary ingredient including at least one of Ba and Ca but essentially including Ba, the rare earth elements include Gd and Dy, and the first auxiliary ingredient and the second auxiliary ingredient satisfy a molar content condition of $0.34 < (Gd/T\_RE)*(Ba+Ca) < 0.68$, where $T\_RE$ is a total molar content of the rare earth elements in the first auxiliary ingredient.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
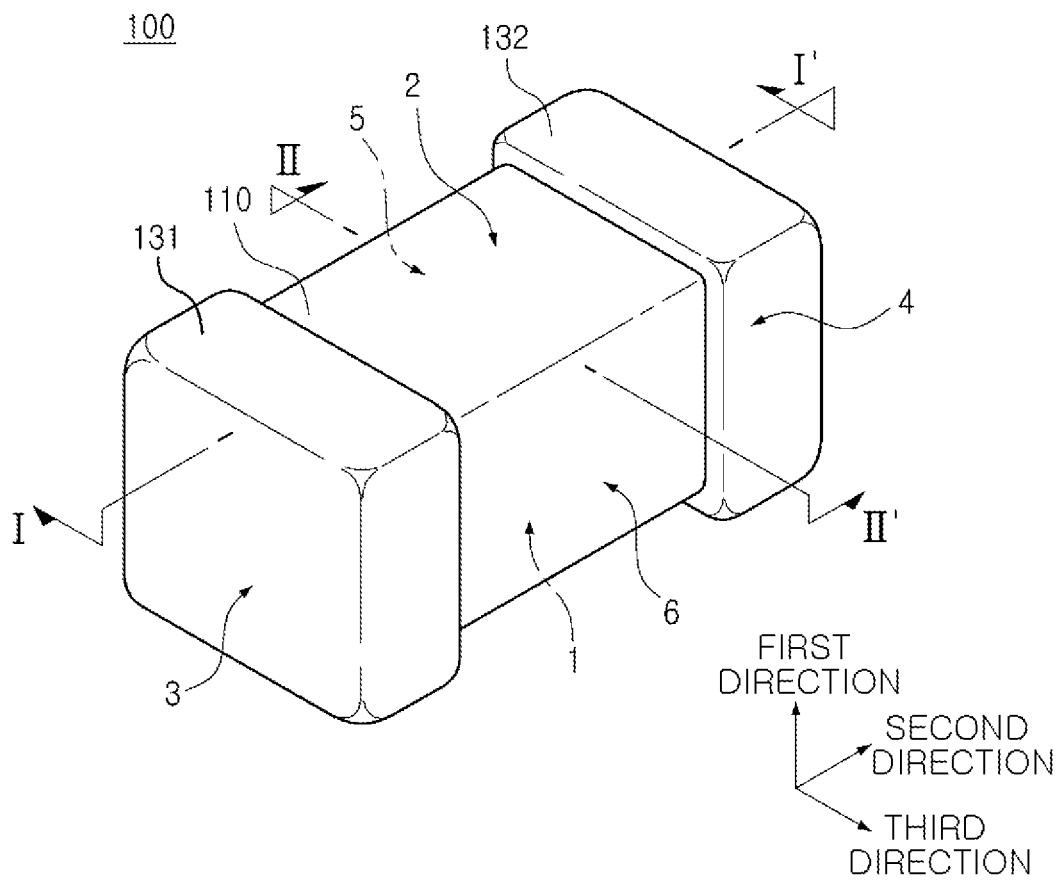
FIG. 1 is a schematic perspective view illustrating a multilayer electronic component according to an exemplary embodiment in the present disclosure.

Hereinafter, exemplary embodiments of the present disclosure will now be described in detail with reference to the accompanying drawings.

A dielectric composition according to an exemplary embodiment in the present disclosure may include a $BaTiO_3$-based main ingredient, a first auxiliary ingredient including rare earth elements, and a second auxiliary ingredient including at least one of Ba and Ca but essentially including Ba, wherein the rare earth elements include Tb and Dy, and the first auxiliary ingredient and the second auxiliary ingredient satisfy a molar content condition of $0.40 < (Tb/T\_RE)*(Ba+Ca) < 0.93$, where $T\_RE$ is a total molar content of the rare earth elements in the first auxiliary ingredient. The dielectric composition satisfying the above-described composition conditions may exhibit high insulation resistance and temperature coefficient of capacitance (TCC) characteristics when used in a dielectric for a multilayer ceramic capacitor (MLCC).

Here, the $BaTiO_3$-based main ingredient may be a composition in which Ca, Zr, Sn, or the like is solid-dissolved in $BaTiO_3$, e.g. $(Ba_{1-x}Ca_x)(Ti_{1-y}Ca_y)O_3$ or $(Ba_{1-x}Ca_x)(Ti_{1-y}Zr_y)O_3$. For example, as a main ingredient, the amount of $BaTiO_3$-based ingredient may be at least 50% by weight of a total weight of $BaTiO_3$-based ingredient and auxiliary ingredients in the dielectric composition. Tb and Dy molar contents may satisfy a condition of $0.35 \leq Tb/Dy \leq 1.20$. In addition, a Tb molar content with respect to the total content (T_RE) of the rare earth elements may satisfy a condition of $0.26 \leq Tb/T\_RE \leq 0.55$. In this case, the rare earth elements may include only Tb and Dy, in other words, may not include a rare earth element other than Tb and Dy. In addition, Ba and Ca molar contents may satisfy a condition of $0 \leq Ca/(Ba+Ca) \leq 0.30$.

The composition conditions of the auxiliary ingredients in the dielectric composition are set based on the functions of the main ingredients and experimental examples, which will be described below. The dielectric composition is sintered, mainly through great densification and grain growth, by virtue of the movement of material between ions. Here, the densification occurs through surface diffusion of ions, and the grain growth occurs through interfacial movement for reducing an overall surface area. In this case, as the number of grain boundaries, which is a high resistance factor, in the dielectric, increases, a charge movement rate may decrease. Therefore, the permittivity of the dielectric may be improved by refining dielectric grains to increase a grain boundary fraction. However, in a thin layer environment (for example, when a thickness of a dielectric layer is 0.5 μm or less) in which an electric field strength increases, a Schottky barrier may be lowered even at the grain boundary, resulting in an increase in electrical conductivity. An element having a higher work function than the $BaTiO_3$-based material may be added as an auxiliary ingredient to form a high potential barrier not only at the grain boundary but also at an interface between a core portion and a shell portion of the dielectric grain, and a method of making surfaces of particles of the $BaTiO_3$-based main ingredient into ionized coating surfaces may be used to increase reactivity between the base material and the additive.

In addition to the consideration of the grain boundary and the interface in the core-shell structure, it is advantageous that an electric charge has a low concentration in order for the dielectric to have a small thickness and a high level of insulation resistance in a high electric field environment. Specifically, by minimizing oxygen vacancy defects, which act as a major factor of a deterioration in insulation resistance of the MLCC, it is possible to prevent formation of p-n junctions in grains, which causes the deterioration in insulation resistance. In the present exemplary embodiment, in order to suppress a conduction phenomenon in the grains, rare earth elements may be used as elements having a strong n-type tendency. Specifically, different rare earth elements may be added as the first auxiliary ingredient to the $BaTiO_3$-based main ingredient, and the rare earth elements may include Tb and Dy or include Gd and Dy. In this case, the rare earth elements may not include a rare earth element other than Tb and Dy or a rare earth element other than Gd and Dy. More specifically, as compared with the use of Dy alone, the use of Tb or Gd, which has a larger ionic radius than Dy, together with Dy makes it possible to implement uniformity between microstructures of dielectric grains and high-temperature reliability. However, if a Tb or Gd content excessively increases, reliability characteristics such as insulation resistance may deteriorate. This is because the addition of Tb or Gd in the excessive amount rapidly decreases the insulation resistance due to excessive semiconductorization resulting from an increase in electron concentration.

The next thing to consider is that atomization of $BaTiO_3$-based main ingredient powder may cause a decrease in tetragonality of a lattice structure of the $BaTiO_3$-based main ingredient, and an increase in surface area of the powder, thereby increasing the reactivity of the powder with additives. Accordingly, the shell portion of the dielectric grain may grow significantly, causing a diffuse phase transition phenomenon in the shell portion and thus generating a nano domain cluster. In addition, this may cause a decrease in TCC. Thus, in the present exemplary embodiment, a content of the second auxiliary ingredient including at least one of Ba and Ca is also optimized to maintain a perovskite structure and minimize a tetragonality decrease phenomenon so that the lattice structure of the $BaTiO_3$-based main ingredient is not destroyed.

Based on the aforementioned considerations and experimental results, the inventors of the present disclosure attempted to optimize the content conditions of the first and second auxiliary ingredients. As a result, above all, the condition for the composition in which Tb and Dy are added has been derived as $0.40<(Tb/T\_RE)*(Ba+Ca)<0.93$. As a more preferable condition, a ratio between Tb and Dy molar contents may satisfy $0.35 \leq Tb/Dy \leq 1.20$ or $0.86 \leq Tb/Dy \leq 1.20$. In addition, $0.26 \leq Tb/T\_RE \leq 0.55$ or $0.46 \leq Tb/T\_RE \leq 0.55$ may be satisfied so that all the rare earth elements are solid-dissolved at a Ba site. The reason why Ba and Ca contents are controlled in addition to the rare earth content is that the solid solubility of the rare earth elements in the lattice structure of the $BaTiO_3$-based main ingredient is affected by how much Ba and Ca are added, and it has been found that, when the above-described condition of $0.40<(Tb/T\_RE)*(Ba+Ca)<0.93$ is satisfied, the rare earth elements added are effectively substituted at the Ba site to act as n-type elements. The condition for the composition in which Gd and Dy are added has been derived as $0.34<(Gd/T\_RE)*(Ba+Ca)<0.68$. As a more preferable condition, a ratio between Gd and Dy molar contents may satisfy $0.42 \leq Gd/Dy \leq 0.60$. In addition, $0.30 \leq Gd/T\_RE \leq 0.38$ may be satisfied so that all the rare earth elements are solid-dissolved at a Ba site.

Furthermore, in the above-described dielectric composition, the molar contents of Ba and Ca as the second auxiliary ingredient, which affects a lattice structure change of the $BaTiO_3$-based main ingredient, may satisfy $0.0 \leq Ca/(Ba+Ca) \leq 0.3$, and in this case, excellent TCC characteristics may be implemented at a high temperature.

As described above, in the dielectric composition according to the present exemplary embodiment, the combination of the rare earth elements added as the first auxiliary ingredient is optimized, and improvements of the dielectric not only in uniformity between microstructures and compactness but also in high-temperature reliability and withstand voltage may be expected therefrom. In addition, a content ratio between rare earth elements may vary depending on what rare earth elements are to be combined together. This may be because of deficient chemical reaction according to differences in ionic radius and valence between Tb or Gd and Ba. That is, the contents of the rare earth elements need to vary depending on what rare earth elements are to be added, because even if the rare earth elements are contained in the same content, a rare earth element having a more similar ionic radius to Ba may have donor-richer deficient chemical reaction, generating electrons and thereby causing n-type conduction. However, when Tb or Gd, which has a strong donor-type tendency, is used alone or added in an excessively high content as compared with Dy, electron emission may be excessive, resulting in a reduction in insulation resistance of the dielectric. Therefore, it is preferable to satisfy the content conditions proposed above.

Next, the principle of improvement in TCC according to the addition of Ba and Ca as the second auxiliary ingredient and an appropriate ratio between Ba and Ca will be described. When Ca having the same valence as Ba, which constitutes the lattice structure of $BaTiO_3$-based main ingredient, but having a slightly smaller ionic radius than Ba is effectively substituted at the Ba site, lattice shrinkage may be induced without deficient chemical bonding. Accordingly, lattice distortion may increase a phase transition temperature (Tc), thereby improving the TCC characteristics of the dielectric. However, when a Ca content exceeds an appropriate amount, a lattice volume excessively decreases, resulting in a decrease in permittivity. Therefore, it is necessary to set an appropriate content ratio between Ba and Ca.

Hereinafter, an example of a multilayer capacitor obtainable by using the above-described dielectric composition will be described. However, the dielectric composition of the present disclosure may be applied to various electronic products, e.g., an inductor, a piezoelectric element, a varistor, or a thermistor, as well as the multilayer capacitor.

Figure 2:
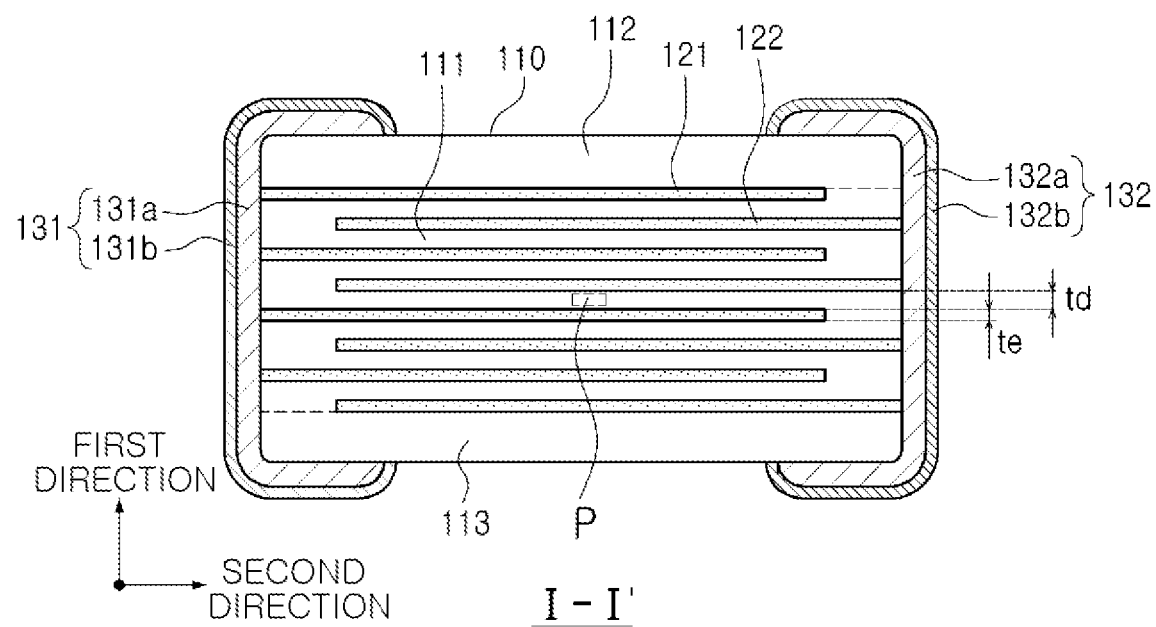
FIG. 2 is a schematic cross-sectional view taken along line I-I' of FIG. 1.
Figure 3:
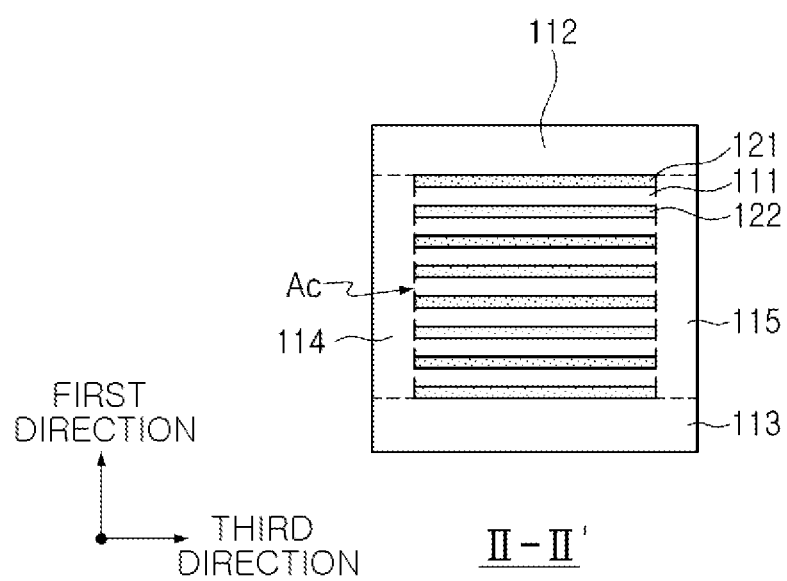
FIG. 3 is a schematic cross-sectional view taken along line II-II' of FIG. 1.
Figure 4:
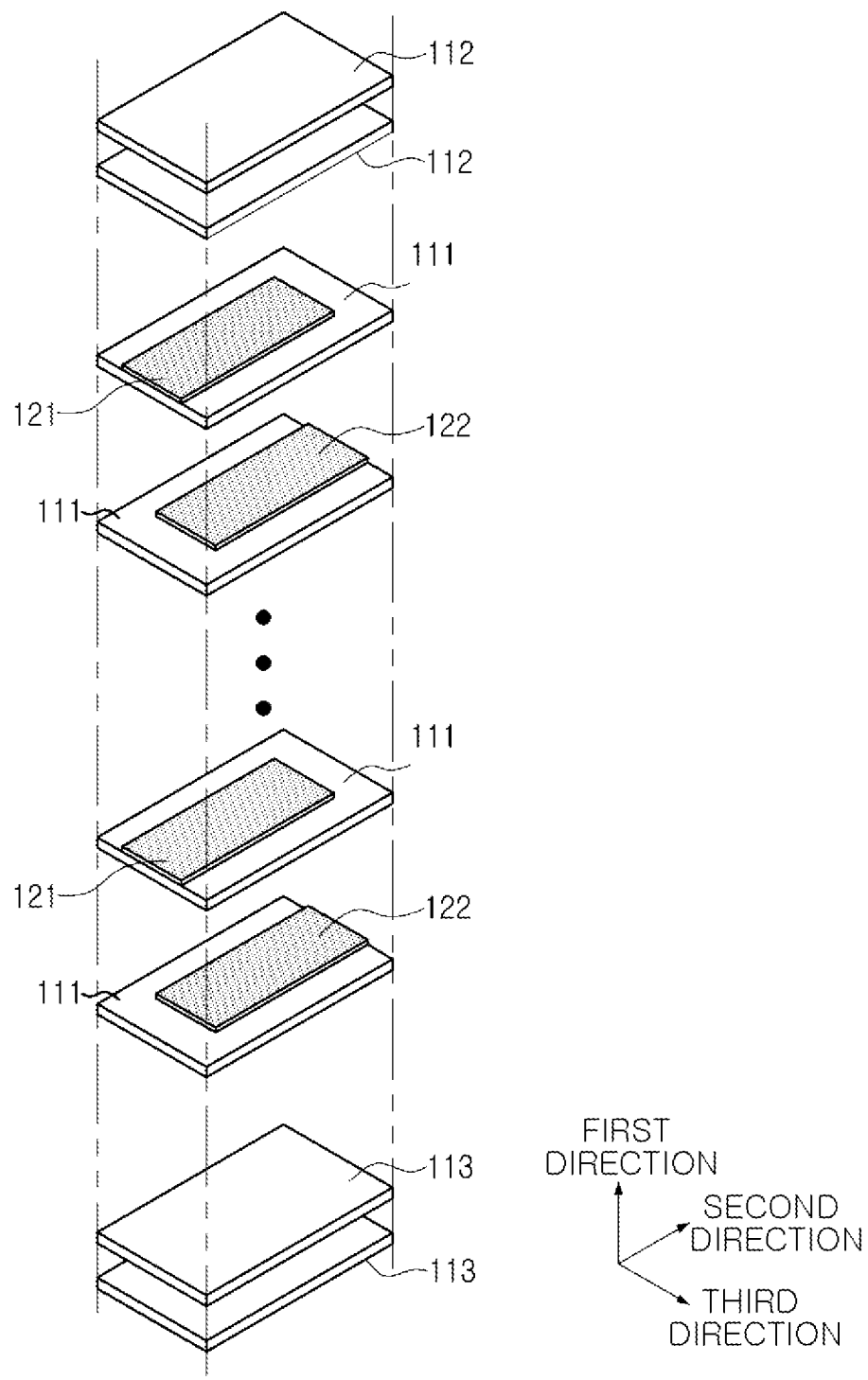
FIG. 4 is a schematic exploded perspective view illustrating a body of the multilayer electronic component according to an exemplary embodiment in the present disclosure.
Figure 5:
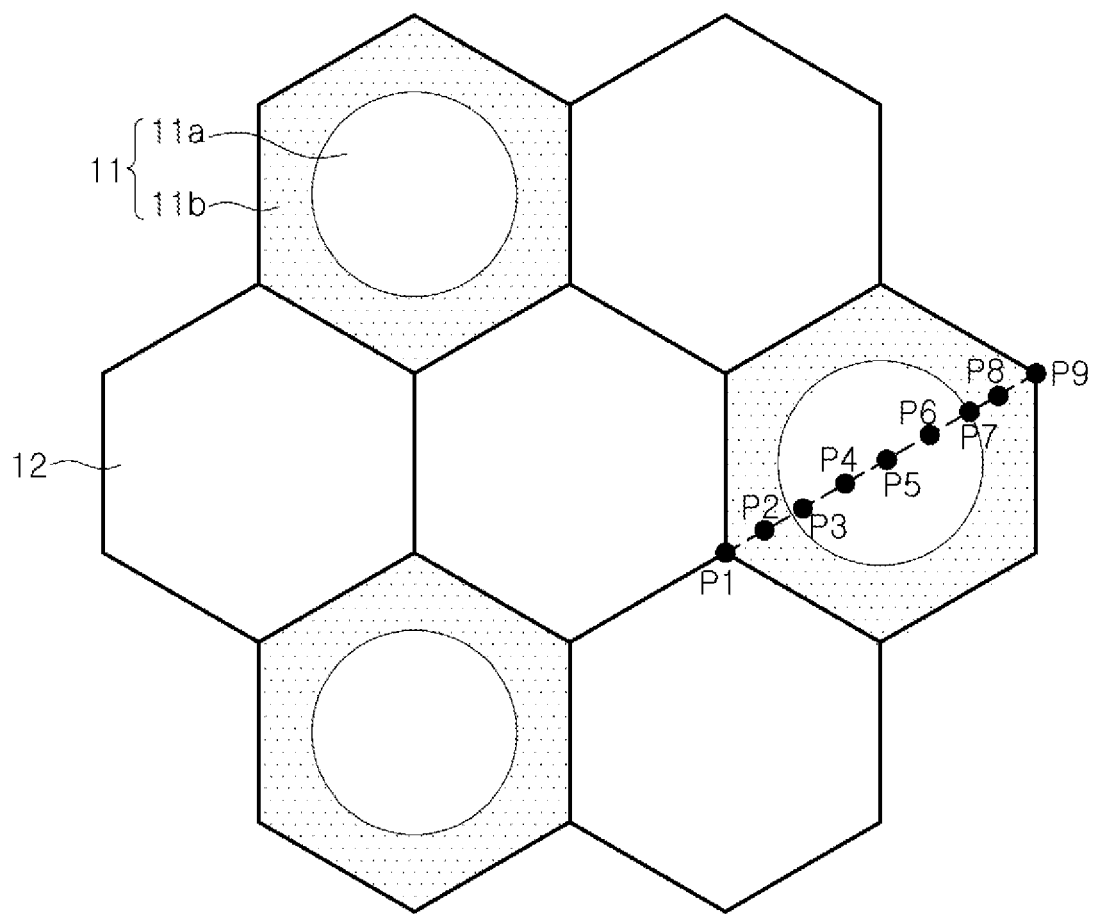
FIG. 5 is a schematic view for explaining microstructures in a dielectric layer of the present disclosure.

FIG. 1 is a schematic perspective view illustrating a multilayer electronic component according to an exemplary embodiment in the present disclosure. FIG. 2 is a schematic cross-sectional view taken along line I-I' of FIG. 1. FIG. 3 is a schematic cross-sectional view taken along line II-II' of FIG. 1. FIG. 4 is a schematic exploded perspective view illustrating a body of the multilayer electronic component according to an exemplary embodiment in the present disclosure. FIG. 5 is a schematic view for explaining microstructures in a dielectric layer of the present disclosure.

Referring to FIGS. 1 through 5, a multilayer capacitor 100 according to an exemplary embodiment in the present disclosure may include a body 110 and external electrodes 131 and 132. Here, the body 110 may include a plurality of dielectric layers 111 and a plurality of internal electrodes 121 and 122 stacked with each of the dielectric layers 111 interposed therebetween.

In the body 110, the dielectric layers 111 and the internal electrodes 121 and 122 may be alternately stacked. A specific shape of the body 110 is not particularly limited, and the body 110 may have a hexahedral shape or the like as illustrated. Although the body 110 does not have a hexahedral shape having perfectly straight lines because ceramic powder included in the body 110 shrink in a sintering process, the body 110 may have a substantially hexahedral shape. The body 110 may have first and second surfaces 1 and 2 facing each other in a first direction, third and fourth surfaces 3 and 4 connected to the first and second surfaces 1 and 2 and facing each other in a second direction, and fifth and sixth surfaces 5 and 6 connected to the first and second surfaces 1 and 2, connected to the third and fourth surfaces 3 and 4, and facing each other in a third direction. The plurality of dielectric layers 111 forming the body 110 may be integrated to such an extent as to be difficult to see a boundary between adjacent dielectric layers 111 in a sintered state without using a scanning electron microscope (SEM).

The body 110 may include a capacitance forming portion Ac disposed in the body 110 and forming capacitance by including first internal electrodes 121 and second internal electrodes 122 disposed to face each other with each of the dielectric layers 111 interposed therebetween, and cover portions 112 and 113 formed on upper and lower surfaces of the capacitance forming portion Ac in the first direction, respectively. In addition, the capacitance forming portion Ac, which contributes to forming the capacitance of the capacitor, may be formed by repeatedly stacking the plurality of first and second internal electrodes 121 and 122 with each of the dielectric layers 111 interposed therebetween.

Referring to FIG. 5, the dielectric layers 111 may include dielectric grains 11 each having a core-shell structure including a core portion 11a and a shell portion 11b having a different composition from the core portion 11a, and may also include dielectric grains 12 each having a non-core-shell structure. When the dielectric layers 111 of the multilayer capacitor 100 are formed using the above-described dielectric composition, the first and second auxiliary ingredients may be solid-dissolved in the $BaTiO_3$-based main ingredient to form a shell portion 11b. Thus, the shell portion 11b may include a $BaTiO_3$-based main ingredient, a first auxiliary ingredient including rare earth elements, and a second auxiliary ingredient including at least one of Ba and Ca but essentially including Ba, wherein the rare earth elements include Tb and Dy, and molar contents of the elements included in the first auxiliary ingredient and the second auxiliary ingredient satisfy a condition of $0.40<(Tb/T\_RE)*(Ba+Ca)<0.93$, where T_RE is a total molar content of the rare earth elements in the first auxiliary ingredient. In addition, the conditions for the above-described dielectric composition may be identically applied to the shell portion 11b. For example, a molar content ratio between Tb and Dy may satisfy $0.35 \leq Tb/Dy \leq 1.20$. In addition, $0.26 \leq Tb/T\_RE \leq 0.55$ may be satisfied so that all the rare earth elements are solid-dissolved at a Ba site. Similarly, when the first auxiliary ingredient of the shell portion 11b includes Gd and Dy as rare earth elements, molar contents of the elements included in the first auxiliary ingredient and the second auxiliary ingredient may satisfy a condition of $0.34<(Gd/T\_RE)*(Ba+Ca)<0.68$. In this case, as a more preferable condition, a molar content ratio between Gd and Dy may satisfy $0.42 \leq Gd/Dy \leq 0.60$. In addition, $0.30 \leq Gd/T\_RE \leq 0.38$ may be satisfied so that all the rare earth elements are solid-dissolved at a Ba site. Furthermore, in the shell portion 11b, the molar contents of Ba and Ca as the second auxiliary ingredient, which affects a lattice structure change of the $BaTiO_3$-based main ingredient, may satisfy $0.0 \leq Ca/(Ba+Ca) \leq 0.3$, and in this case, excellent TCC characteristics may be implemented at a high temperature.

When a diameter of the core portion 11a in the dielectric grain 11 having the core-shell structure is defined as D1, D1 may satisfy a condition of $5\ nm \leq D1 \leq 100$ nm. In addition, when a diameter of the dielectric grain 11 is defined as D2, D2 may satisfy a condition of $50\ nm \leq D2 \leq 600$ nm. In this case, the diameter of the dielectric grain 11 may be a value obtained by measuring an area of each of the dielectric grains 11, converting the dielectric grain 11 into a circle having the measured area, and calculating a diameter of the circle equivalent to the dielectric grain 11. Concerning the contents of the rare earth elements, i.e., Tb or Gd and Dy, in the dielectric grain 11 having the core-shell structure, a line segment may be drawn from one end to the opposite end of one grain 11 with nine points P1 to P9 put at equal intervals as shown in FIG. 5, and contents of at least one of Tb or Gd and Dy at P1 to P9 may be analyzed using STEM/EDS. More specifically, after region P of FIG. 2 is scanned by a STEM to obtain an image thereof, contents of an element to be detected at the positions P1 to P9 may be analyzed through STEM/EDS analysis. Through this analysis, a boundary between the core portion 11a and the shell portion 11b may be determined. For example, inwardly of a surface of the dielectric grain 11, a region in which a molar content of the rare earth element is 20% or less of the shell portion 11b may be determined as a boundary. In this case, the molar content of the rare earth element of the shell portion 11b may be the molar content on the surface of the shell portion 11b.

Meanwhile, the auxiliary ingredient included in the above-described dielectric composition may be added in the form of an oxide or a carbonate, but may be present in a solid-dissolved form in the $BaTiO_3$-based main ingredient, rather than in the form of the oxide or the carbonate, after being sintered. However, a content ratio between main elements of the auxiliary ingredient may be kept almost constant, and respective contents of elements of the dielectric layer after being sintered may be calculated based on the contents of the main ingredient and auxiliary ingredients included in the dielectric composition before the dielectric layer is sintered. In addition, the respective contents of the elements included in the dielectric layer 111 may be measured using a non-destructive method, a destructive method, or the like. For example, in the non-destructive method, ingredients inside a dielectric grain in a central portion of a chip may be analyzed using TEM-EDS. Specifically, an analysis sample slice may be prepared using focused ion beam (FIB) equipment from a region including a dielectric layer in a cross section of a body having been sintered. Then, a damaged layer may be removed from a surface of the sample slice using Ar ion milling, and thereafter, mapping and quantitative analysis may be performed for each ingredient from an obtained image using STEM-EDS. In this case, a quantitative analysis graph for each ingredient may be obtained based on a mass fraction of each element, which may be converted into and expressed as a mole fraction or an atomic fraction. On the other hand, in the destructive method, a dielectric may be separated after a multilayer capacitor is crushed and internal electrodes are removed, and ingredients of the dielectric separated as described above may be analyzed using a device such as an inductively coupled plasma-optical emission spectroscopy (ICP-OES) or an inductively coupled plasma-mass spectroscopy (ICP-MS). Meanwhile, Ba and Ca detected in the shell portion 11b may be considered as being added as auxiliary ingredients, and may be distinguished from Ba and Ca constituting the lattice structure in the core portion 11a.

Hereinafter, other components of the body 110 will be described, and the above-described dielectric compositions may be used when forming cover portions 112 and 113 and margin portions 114 and 115 as well as the dielectric layers 111.

The cover portions 112 and 113 may include an upper cover portion 112 disposed on the upper surface of the capacitance forming portion Ac in the first direction and a lower cover portion 113 disposed on the lower surface of the capacitance forming portion Ac in the first direction. The upper cover portion 112 and the lower cover portion 113 may be formed by stacking a single dielectric layer or two or more dielectric layers on each of the upper and lower surfaces of the capacitance forming portion Ac in a thickness direction, and may basically serve to prevent the internal electrodes from being damaged due to physical or chemical stress. The upper cover portion 112 and the lower cover portion 113 may include the same material as the dielectric layers 111, while including no internal electrodes. That is, the upper cover portion 112 and the lower cover portion 113 may include a ceramic material, e.g., a barium titanate ($BaTiO_3$)-based ceramic material. Meanwhile, it is not necessary to particularly limit a thickness of each of the cover portions 112 and 113. However, in order to more easily achieve a decrease in size of the multilayer electronic component and an increase in capacitance of the multilayer electronic component, the thickness of each of the cover portions 112 and 113 may be 20 μm or less.

The margin portions 114 and 115 may be disposed on side surfaces of the capacity forming portion Ac. The margin portions 114 and 115 may include a margin portion 114 disposed on the fifth surface 5 of the body 110 and a margin portion 115 disposed on the sixth surface 6 of the body 110. That is, the margin portions 114 and 115 may be disposed on opposite side surfaces of the ceramic body 110 in a width direction. As illustrated in FIG. 3, the margin portions 114 and 115 may refer to regions between both ends of the first and second internal electrodes 121 and 122 and boundary surfaces of the body 110 in a cross section of the body 110 cut in the width and thickness (W-T) directions. The margin portions 114 and 115 may basically serve to prevent the internal electrodes from being damaged due to physical or chemical stress. The margin portions 114 and 115 may be formed by applying a conductive paste for forming internal electrodes onto ceramic green sheets except places where the margin portions are to be formed. Alternatively, in order to suppress unevenness in thickness of the capacitance forming portion Ac due to the internal electrodes 121 and 122, the margin portions 114 and 115 may be formed by cutting a laminate formed by stacking the ceramic green sheets with the conductive paste for forming internal electrodes applied thereonto so that the internal electrodes are exposed to the fifth and sixth surfaces 5 and 6 of the body, and then stacking a single dielectric layer or two or more dielectric layers on each of opposite side surfaces of the capacitance forming portion Ac in the width direction (third direction).

Meanwhile, it is not necessary to particularly limit a thickness td of each of the dielectric layers 111. However, in general, when the dielectric layers are formed to have a small thickness of less than 0.6 μm, in particular 0.5 μm or less, there is concern that reliability may decrease. As described above, according to an exemplary embodiment in the present disclosure, it is possible to secure high permittivity at room temperature, excellent DC-bias characteristics, and excellent high-temperature withstand voltage characteristics, and thus, excellent reliability can be secured even when the thickness of each of the dielectric layers 111 is 0.5 μm or less. Therefore, when the thickness of each of the dielectric layers 111 is 0.5 μm or less, the reliability improving effect according to the present disclosure can be more remarkable. The thickness td of each of the dielectric layers 111 may refer to an average thickness of each of the dielectric layers 111 disposed between the first and second internal electrodes 121 and 122. The average thickness of each of the dielectric layers 111 may be measured from an image obtained by scanning a cross section of the body 110 in the length and thickness (L-T) directions using a scanning electron microscope (SEM). For example, with respect to any dielectric layer extracted from an image obtained by scanning a cross section of the body 110 in the first and second directions (the length and thickness directions) cut at a central portion of the body 110 in the third direction (the width direction) using the scanning electron microscope (SEM), thicknesses of the dielectric layer at 30 points equally spaced in the length direction may be measured to obtain an average value. The thicknesses of the dielectric layer at the equally-spaced 30 points may be measured within the capacitance forming portion Ac, which refers to a region in which the first and second internal electrodes 121 and 122 overlap each other.

The internal electrodes 121 and 122 may be stacked alternately with the dielectric layers 111. The internal electrodes 121 and 122 may include first and second internal electrodes 121 and 122. The first and second internal electrodes 121 and 122 may be alternately disposed to face each other with each of the dielectric layers 111 constituting the body 110 interposed therebetween, and exposed to the third and fourth surfaces 3 and 4 of the body 110, respectively. Referring to FIG. 2, the first internal electrodes 121 may be spaced apart from the fourth surface 4 of the body 110 and exposed through the third surface 3 of the body 110, and the second internal electrodes 122 may be spaced apart from the third surface 3 of the body 110 and exposed through the fourth surface 4 of the body 110. In this case, the first and second internal electrodes 121 and 122 may be electrically disconnected from each other by each of the dielectric layers 111 disposed therebetween. Referring to FIG. 4, the body 110 may be formed by alternately stacking ceramic green sheets on which the first internal electrodes 121 are printed and ceramic green sheets on which the second internal electrode 122 are printed, followed by sintering. A material for forming the internal electrodes 121 and 122 is not particularly limited, and may be a material having excellent electrical conductivity. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and an alloy thereof. In addition, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), and an alloy thereof on ceramic green sheets. The conductive paste for internal electrodes may be printed using a screen printing method, a gravure printing method, or the like, but the method of printing the conductive paste is not limited thereto.

Meanwhile, it is not necessary to particularly limit a thickness te of each of the internal electrodes 121 and 122. However, in general, when the internal electrodes are formed to have a small thickness of less than 0.6 μm, in particular 0.5 μm or less, there is concern that reliability may decrease. As described above, according to an exemplary embodiment in the present disclosure, it is possible to secure high permittivity at room temperature, excellent DC-bias characteristics, and excellent high-temperature withstand voltage characteristics, and thus, excellent reliability can be secured even when the thickness of each of the internal electrodes 121 and 122 is 0.5 μm or less. Therefore, when the thickness of each of the internal electrodes 121 and 122 is 0.5 μm or less, the effect according to the present disclosure can be more remarkable, and the decrease in size and the increase in capacitance of the multilayer electronic component can be easily achieved. The thickness te of each of the internal electrodes 121 and 122 may refer to an average thickness of each of the first and second internal electrodes 121 and 122. The average thickness of each of the internal electrodes 121 and 122 may be measured from an image obtained by scanning a cross section of the body 110 in the length and thickness (L-T) directions using a scanning electron microscope (SEM). For example, with respect to any one of first and second internal electrodes 121 and 122 extracted from an image obtained by scanning a cross section of the body 110 in the first and second directions (the length and thickness directions) cut at a central portion of the body 110 in the third direction (the width direction) using the scanning electron microscope (SEM), thicknesses of the internal electrode at 30 points equally spaced in the length direction may be measured to obtain an average value. The thicknesses of the internal electrode at the equally-spaced 30 points may be measured within the capacitance forming portion Ac, which refers to a region in which the first and second internal electrodes 121 and 122 overlap each other.

The external electrodes 131 and 132 may be disposed on the third surface 3 and the fourth surface 4 of the body 110, respectively. The external electrodes 131 and 132 may include first and second external electrodes 131 and 132 disposed on the third and fourth surfaces 3 and 4 of the body 110, respectively, and connected to the first and second internal electrodes 121 and 122, respectively. Referring to FIG. 1, the external electrodes 131 and 132 may be disposed to cover opposite end surfaces of the side margin portions 114 and 115 in the second direction. Although it is described in the present exemplary embodiment that the multilayer electronic component 100 includes two external electrodes 131 and 132, the number, the shape, and the like of external electrodes 131 and 132 may be modified depending on shapes of the internal electrodes 121 and 122 or according to other purposes. Meanwhile, the external electrodes 131 and 132 may be formed using any type of material as long as it has electrical conductivity, such as a metal, and a specific material for forming the external electrodes 131 and 132 may be determined in consideration of electrical characteristics, structural stability, etc. Furthermore, the external electrodes 131 and 132 may have a multilayer structure. For example, the external electrodes 131 and 132 may include electrode layers 131a and 132a disposed on the body 110, and plating layers 131b and 132b formed on the electrode layers 131a and 132a, respectively. As a more specific example of the electrode layers 131a and 132a, each of the electrode layers 131a and 132a may be a fired electrode including a conductive metal and a glass or a resin-based electrode including a conductive metal or a resin.

Alternatively, each of the electrode layers 131a and 132a may be formed by sequentially stacking a fired electrode and a resin-based electrode on the body. In addition, each of the electrode layers 131a and 132a may be formed by transferring a sheet including a conductive metal onto the body or by transferring a sheet including a conductive metal onto a fired electrode. The conductive metal included in the electrode layers 131a and 132a may be a material having excellent electrical connectivity, but is not particularly limited thereto. For example, the conductive metal may be one or more of nickel (Ni), copper (Cu), and an alloy thereof. The plating layers 131b and 132b may serve to improve mounting characteristics of the multilayer electronic component. The type of material for forming the plating layers 131b and 132b is not particularly limited, and may include one or more of Ni, Sn, Pd, and an alloy thereof. Also, each of the plating layers 131b and 132b may be formed as a plurality of layers. As a more specific example of the plating layers 131b and 132b, the plating layers 131b and 132b may be Ni plating layers or Sn plating layers, or may be formed by sequentially stacking Ni plating layers and Sn plating layers on the electrode layers 131a and 132a, respectively, or by sequentially stacking Sn plating layers, Ni plating layers, and Sn plating layers on the electrode layers 131a and 132a, respectively. Alternatively, each of the plating layers 131b and 132b may include a plurality of Ni plating layers and/or a plurality of Sn plating layers.

It is not necessary to particularly limit a size of the multilayer electronic component 100. However, in order to achieve both the decrease in size and the increase in capacitance of the multilayer electronic component, it is required to increase the number of dielectric layers and internal electrodes stacked by decreasing the thicknesses of the dielectric layers and the internal electrodes. For example, when the multilayer electronic component 100 has a size of 0402 (length×width=0.4 mm×0.2 mm) or less, the effects according to the present disclosure can be more remarkable in improving DC-bias characteristics and high-temperature withstand voltage characteristics. Therefore, considering manufacturing errors, sizes of external electrodes, etc., when the multilayer electronic component 100 has a length of 0.44 mm or less and a width of 0.22 mm or less, the reliability improving effect according to the present disclosure can be more remarkable. Here, the length of the multilayer electronic component 100 may refer to a maximum size of the multilayer electronic component 100 in the second direction, and the width of the multilayer electronic component 100 may refer to a maximum size of the multilayer electronic component 100 in the third direction.

Hereinafter, the present disclosure will be described in more detail through experimental examples performed by the inventors of the present disclosure, but the experimental examples are presented to help specifically understand the disclosure, and the scope of the present disclosure is not limited only by the experimental examples.

As a base material main ingredient, $BaTiO_3$ powder having a grain size of 300 nm or more and 100 nm or less was used. In this case, specific compositions of the auxiliary ingredients were as shown in Table 1 below. A ceramic slurry was prepared by mixing/dispersing base material main ingredient powder and auxiliary ingredient powders using zirconia balls, mixing ethanol/toluene and a dispersant therewith, and then performing mechanical milling. A sintering aid ingredient including Si, Al, Na, Li, or the like was added together with the main ingredient and the auxiliary ingredients. In addition, a binder mixing process was added to increase a strength of a dielectric sheet. Ceramic green sheets for forming a laminate were formed using the slurry prepared, and an internal electrode paste was applied onto the ceramic green sheets. In addition, sheets were manufactured at a thickness of about 0.8 μm from the slurry prepared using an on-roll molding coater in a head-discharge type, and the molding sheets obtained as described above were attached onto sides of the laminate to which internal electrodes are exposed to form side margin portions. As a result, the laminate having a length of 0.6 mm, a width of 0.3 mm, and a height of 0.3 mm before being sintered was obtained.

Meanwhile, in Table 1, a content of an auxiliary ingredient refers to a molar content of an auxiliary ingredient added to a sample based on 100 moles of the $BaTiO_3$-based main ingredient. Specifically, Tb, Dy, Gd, Ba, and Ca elements were added in the forms of $Tb_4O_7$, $Dy_2O_3$, $Gd_2O_3$, $BaCO_3$, and $CaCO_3$, respectively. Thus, when Tb, Dy, and Gd are present in the ionic forms in the body having been sintered, their contents may be tour times, two times, and two times the amounts of the oxides added, respectively. For example, when 1 mole of $Dy_2O_3$ is added, 2 moles of Dy may be present in the ceramic body having been sintered. In terms of a method of adding an auxiliary ingredient, an auxiliary ingredient was added in the form of an oxide in Sample Nos. 1 to 27, whereas an ion coating method was used to ionize surfaces of base material particles in Sample Nos. 27 to 30.

TABLE 1

| | $Tb_4O_7$ | $Dy_2O_3$ | $Gd_2O_3$ | $BaCO_3$ | $CaCO_3$ | A = Tb/Dy or Gd/Dy | B = Tb/T_RE or Gd/T_RE | B* (Ba + Ca) |
|---|---|---|---|---|---|---|---|---|
| 1 | 0.0 | 2.0 | 0.0 | 1.5 | 0.0 | 0 | 0 | 0 |
| 2 | 0.15 | 1.85 | 0.0 | 1.5 | 0.0 | 0.16 | 0.14 | 0.21 |
| 3 | 0.30 | 1.7 | 0.0 | 1.5 | 0.0 | 0.35 | 0.26 | 0.39 |
| 4* | 0.45 | 1.55 | 0.0 | 1.5 | 0.0 | 0.58 | 0.37 | 0.55 |
| 5* | 0.60 | 1.4 | 0.0 | 1.5 | 0.0 | 0.86 | 0.46 | 0.69 |
| 6* | 0.75 | 1.25 | 0.0 | 1.5 | 0.0 | 1.2 | 0.55 | 0.82 |
| 7 | 0.9 | 1.1 | 0.0 | 1.5 | 0.0 | 1.6 | 0.62 | 0.93 |
| 8 | 1.05 | 0.95 | 0.0 | 1.5 | 0.0 | 2.2 | 0.69 | 1.0 |
| 9 | 0 | 1.85 | 0.15 | 1.5 | 0.0 | 0.08 | 0.075 | 0.11 |
| 10 | 0 | 1.7 | 0.3 | 1.5 | 0.0 | 0.18 | 0.15 | 0.23 |
| 11 | 0 | 1.55 | 0.45 | 1.5 | 0.0 | 0.29 | 0.23 | 0.34 |
| 12* | 0 | 1.4 | 0.6 | 1.5 | 0.0 | 0.42 | 0.3 | 0.45 |
| 13* | 0 | 1.25 | 0.75 | 1.5 | 0.0 | 0.6 | 0.38 | 0.56 |
| 14 | 0 | 1.1 | 0.9 | 1.5 | 0.0 | 0.82 | 0.45 | 0.68 |
| 15 | 0 | 0.95 | 1.05 | 1.5 | 0.0 | 1.1 | 0.53 | 0.79 |
| 16 | 0.3 | 1.7 | 0.0 | 0.0 | 1.5 | 0.35 | 0.26 | 0.39 |
| 17 | 0.45 | 1.55 | 0.0 | 0.0 | 1.5 | 0.58 | 0.37 | 0.55 |
| 18 | 0.6 | 1.4 | 0.0 | 0.0 | 1.5 | 0.86 | 0.46 | 0.69 |
| 19 | 0.3 | 1.7 | 0.0 | 1.0 | 0.5 | 0.35 | 0.26 | 0.39 |
| 20* | 0.45 | 1.55 | 0.0 | 1.0 | 0.5 | 0.58 | 0.37 | 0.55 |
| 21* | 0.6 | 1.4 | 0.0 | 1.0 | 0.5 | 0.86 | 0.46 | 0.69 |
| 22 | 0.3 | 1.7 | 0.0 | 0.0 | 1.0 | 0.35 | 0.26 | 0.26 |
| 23 | 0.45 | 1.55 | 0.0 | 0.0 | 1.0 | 0.58 | 0.37 | 0.37 |
| 24 | 0.6 | 1.4 | 0.0 | 0.0 | 1.0 | 0.86 | 0.46 | 0.46 |
| 25 | 0.3 | 1.7 | 0.0 | 1.0 | 0.5 | 0.35 | 0.26 | 0.39 |
| 26 | 0.45 | 1.55 | 0.0 | 1.0 | 0.5 | 0.58 | 0.37 | 0.55 |
| 27 | 0.6 | 1.4 | 0.0 | 1.0 | 0.5 | 0.86 | 0.46 | 0.69 |
| 28* | 0.3 | 1.7 | 0.0 | 1.0 | 0.5 | 0.35 | 0.26 | 0.39 |
| 29* | 0.45 | 1.55 | 0.0 | 1.0 | 0.5 | 0.58 | 0.37 | 0.55 |
| 30* | 0.6 | 1.4 | 0.0 | 1.0 | 0.5 | 0.86 | 0.46 | 0.69 |

The green chip-type laminate manufactured as described above was sintered at a sintering temperature of 1200° C. or less and at a hydrogen concentration of 1.0% ($H_2$) or less after a binder burn-out process at a temperature of 900° C. or less and under a nitrogen atmosphere. Thereafter, with respect to the samples obtained, structural characteristics (compactness, uniformity between microstructures, and secondary phase control), and electrical characteristics (permittivity, withstand voltage, high temperature reliability, and temperature characteristics) were measured, and the results were obtained as shown in Table 2 below. Specifically, each sample was tested by measuring a room-temperature capacitance and a dielectric loss at 1 kHz and at AC 0.5 V using an LCR meter, and measuring a breakdown voltage (BDV), at which dielectric breakdown occurred, for the withstand voltage characteristics. A mean time to failure (MTTF) was measured for the high-temperature reliability, and a capacitance change rate compared to a capacitance at room temperature (about 25° C.) was monitored for the TCC temperature characteristics by measuring a capacitance in each temperature section in the range of −55° C. to +105° C. while raising or lowering a temperature under the condition that the temperature is maintained for 5 minutes in each temperature section. For the structural characteristics, a compactness, a degree of uniformity in size between grains, and an amount of secondary phase generation were measured with respect to a fractured surface and a polished surface of each of the samples. Symbols used in Table 2 below indicate ⊚: excellent, ○: good, Δ: normal, and X: Poor.

TABLE 2

| | compactness | Uniformity Between Microstructures | Secondary Phase Control | Permittivity | Withstand Voltage | High Temperature Reliability | Temperature Characteristics |
|---|---|---|---|---|---|---|---|
| 1 | Δ | Δ | X | ○ | Δ | Δ | X |
| 2 | ○ | ○ | ○ | ○ | ○ | ○ | Δ |
| 3 | ○ | ○ | ○ | ○ | ○ | ⊚ | Δ |
| 4* | ○ | ○ | ○ | ○ | ○ | ⊚ | ○ |
| 5* | ○ | ○ | ○ | ○ | ○ | ⊚ | ○ |
| 6* | ○ | ○ | ○ | ○ | ○ | ○ | ○ |
| 7 | ⊚ | ⊚ | ⊚ | ⊚ | Δ | Δ | ○ |
| 8 | ⊚ | ⊚ | ⊚ | ⊚ | X | X | ○ |
| 9 | ○ | ○ | ○ | ○ | Δ | Δ | X |
| 10 | ○ | ○ | ○ | ○ | ○ | ○ | Δ |
| 11 | ○ | ○ | ○ | ○ | ○ | Δ | ○ |
| 12* | ○ | ○ | ○ | ○ | ○ | ○ | ○ |
| 13* | ○ | ○ | ○ | ○ | ○ | ○ | ○ |
| 14 | ○ | ○ | ○ | ○ | Δ | Δ | ○ |
| 15 | ⊚ | ⊚ | ⊚ | ⊚ | X | X | ○ |
| 16 | Δ | ○ | ○ | Δ | ○ | ⊚ | ○ |
| 17 | ○ | ○ | ○ | X | ○ | ⊚ | ○ |
| 18 | ○ | ○ | ○ | X | ○ | ⊚ | ⊚ |

TABLE 2-continued

| | compactness | Uniformity Between Microstructures | Secondary Phase Control | Permittivity | Withstand Voltage | High Temperature Reliability | Temperature Characteristics |
|---|---|---|---|---|---|---|---|
| 19 | Δ | ○ | ○ | Δ | ○ | ◎ | ○ |
| 20* | ○ | ○ | ○ | ○ | ○ | ◎ | ◎ |
| 21* | ○ | ○ | ○ | ○ | ○ | ◎ | ◎ |
| 22 | ○ | ○ | ○ | Δ | ○ | ◎ | ◎ |
| 23 | ○ | ○ | ○ | Δ | ○ | ◎ | ◎ |
| 24 | Δ | ○ | ○ | Δ | ○ | ◎ | ◎ |
| 25 | Δ | ○ | ○ | Δ | Δ | Δ | ◎ |
| 26 | ○ | ○ | ○ | ○ | Δ | Δ | ◎ |
| 27 | ○ | ○ | ○ | ○ | Δ | ○ | ◎ |
| 28* | ○ | ○ | ○ | ○ | ○ | ○ | ◎ |
| 29* | ○ | ○ | ○ | ○ | ○ | ◎ | ◎ |
| 30* | ○ | ○ | ○ | ○ | ◎ | ◎ | ◎ |

The above experimental results will be discussed below. In the examples (Sample Nos. 4-6, 12-13, 20-21, and 28-30 marked with "*") satisfying the content conditions of the auxiliary ingredients proposed in the present exemplary embodiment, both structural and electrical characteristics were good or excellent. These results indicate that, as compared with the use of Dy alone as a rare earth element (Sample No. 1), the use of a rare earth element having a larger ionic radius than Dy, such as Tb or Gd, together with Dy makes it possible to implement uniformity between microstructures and high-temperature reliability as described above. However, if the relative content of Tb or Gd to the amount of Dy excessively increases, the characteristics may rather deteriorate. This is because the addition of Tb or Gd in the excessive amount rapidly decreases an insulation resistance due to semiconductorization resulting from an increase in electron concentration. In addition, according to the above experimental results, not only the content conditions of the rare earth elements but also the contents of Ba and Ca, which are elements of the second auxiliary ingredient, also affect the characteristics. This is because a solid-dissoluble amount of the rare earth elements in the lattice structure of the $BaTiO_3$-based main ingredient is affected by the Ba and Ca contents. In order for the rare earth elements to be effectively substituted at the Ba site to act as n-type elements, when the composition in which Tb and Dy were added satisfied the conditions of $0.40<(Tb/T\_RE)*(Ba+Ca)<0.93$, $0.35 \leq Tb/Dy \leq 1.20$, and $0.26 \leq Tb/T\_RE \leq 0.55$, structural and electrical characteristics could be sufficiently secured. In addition, when the composition in which Gd and Dy were added satisfied the conditions of $0.34<(Gd/T\_RE)*(Ba+Ca)<0.68$, $0.42 \leq Gd/Dy \leq 0.60$, and $0.30 \leq Gd/T\_RE \leq 0.38$, both structural and electrical characteristics could be sufficiently secured.

As set forth above, the dielectric composition according to an exemplary embodiment in the present disclosure is capable of improving structural and electrical characteristics, and improving reliability when used in a multilayer capacitor.

While exemplary embodiments have been shown and described above, it will be apparent to those skilled in the art that modifications and variations could be made without departing from the scope of the present disclosure as defined by the appended claims.

What is claimed is:

1. A dielectric composition comprising:
    a $BaTiO_3$-based main ingredient;
    a first auxiliary ingredient including rare earth elements; and
    a second auxiliary ingredient including Ba and Ca,
    wherein the rare earth elements include Tb and Dy,
    Ba and Ca molar contents satisfy a condition of $0<Ca/(Ba+Ca) \leq 0.30$,
    Tb and Dy molar contents satisfy a condition of $0.35 \leq Tb/Dy \leq 1.20$, the Tb molar content is in a range of from 1.2 moles to 3 moles per 100 moles of the $BaTiO_3$-based main ingredient, and the Dy molar content is in a range of from 2.5 to 3.4 moles per 100 moles of the $BaTiO_3$-based main ingredient, and
    the first auxiliary ingredient and the second auxiliary ingredient satisfy a molar content condition of $0.40<(Tb/T\_RE)*(Ba+Ca)<0.93$, where T_RE is a total molar content of the rare earth elements in the first auxiliary ingredient.

2. The dielectric composition of claim 1, wherein Tb and Dy molar contents satisfy a condition of $0.35 \leq Tb/Dy \leq 1.20$.

3. The dielectric composition of claim 1, wherein a molar content of the first auxiliary ingredient satisfies a condition of $0.26 \leq Tb/T\_RE \leq 0.55$.

4. The dielectric composition of claim 1, wherein the rare earth elements do not include a rare earth element other than Tb and Dy.

5. The dielectric composition of claim 1, wherein Tb and Dy molar contents satisfy a condition of $0.86 \leq Tb/Dy \leq 1.20$.

6. The dielectric composition of claim 1, wherein a molar content of the first auxiliary ingredient satisfies a condition of $0.46 \leq Tb/T\_RE \leq 0.55$.

7. A multilayer capacitor comprising:
    a body including a dielectric layer and a plurality of internal electrodes stacked with the dielectric layer interposed therebetween; and
    external electrodes disposed on the body and connected to the plurality of internal electrodes,
    wherein the dielectric layer includes a dielectric grain having a core-shell structure including a core portion and a shell portion, the shell portion having a different composition from the core portion,
    the shell portion includes a $BaTiO_3$-based main ingredient, a first auxiliary ingredient including rare earth elements, and a second auxiliary ingredient including at least one of Ba and Ca,
    the rare earth elements include Tb and Dy,
    Tb and Dy molar contents satisfy a condition of $0.35 \leq Tb/Dy \leq 1.20$,
    the Tb molar content is in a range of from 1.2 moles to 3 moles per 100 moles of the $BaTiO_3$-based main ingredient,
    the Dy molar content is in a range of from 2.5 to 3.4 moles per 100 moles of the $BaTiO_3$-based main ingredient, and the first auxiliary ingredient and the second auxiliary ingredient satisfy a molar content condition of 0.40<(Tb/T_RE)*(Ba+Ca)<0.93, where T_RE is a total molar content of the rare earth elements in the first auxiliary ingredient.

8. The multilayer capacitor of claim 7, wherein D1 satisfies a condition of 5 nm≤D1<100 nm, where D1 is a diameter of the core portion.

9. The multilayer capacitor of claim 7, wherein D2 satisfies a condition of 50 nm≤D2≤600 nm, where D2 is a diameter of the dielectric grain.

10. The multilayer capacitor of claim 7, wherein a molar content of the first auxiliary ingredient satisfies a condition of 0.26≤Tb/T_RE≤0.55.

11. The multilayer capacitor of claim 7, wherein Ba and Ca molar contents satisfy a condition of 0≤Ca/(Ba+Ca)≤0.30.

12. The multilayer capacitor of claim 7, wherein the rare earth elements do not include a rare earth element other than Tb and Dy.

13. The multilayer capacitor of claim 7, wherein the second auxiliary ingredient includes Ba.

14. The multilayer capacitor of claim 7, wherein Tb and Dy molar contents satisfy a condition of 0.86≤Tb/Dy≤1.20.

15. The multilayer capacitor of claim 7, wherein a molar content of the first auxiliary ingredient satisfies a condition of 0.46≤Tb/T_RE≤0.55.

* * * * *